(12) United States Patent
Zuccalli

(10) Patent No.: US 7,000,511 B2
(45) Date of Patent: Feb. 21, 2006

(54) MULTI-STATION MACHINE WITH ROTATING TRANSFER FOR MACHINING PIECES

(75) Inventor: Laurent Zuccalli, Frangy (FR)

(73) Assignee: Machines-Outils Wirth & Gruffat, Argonay (FR)

( * ) Notice: Subject to any disclaimer, the term of this patent is extended or adjusted under 35 U.S.C. 154(b) by 0 days.

(21) Appl. No.: 10/480,876

(22) PCT Filed: Jun. 14, 2002

(86) PCT No.: PCT/FR02/02037

§ 371 (c)(1),
(2), (4) Date: Dec. 12, 2003

(87) PCT Pub. No.: WO02/102542

PCT Pub. Date: Dec. 27, 2002

(65) Prior Publication Data

US 2004/0163509 A1 Aug. 26, 2004

(30) Foreign Application Priority Data

Jun. 15, 2001 (FR) .................................. 01 08067

(51) Int. Cl.
*B32B 9/00* (2006.01)
(52) U.S. Cl. ........................... 82/123; 82/129; 82/155; 82/162
(58) Field of Classification Search .................. 82/123, 82/129, 142, 143, 145, 146, 155, 156, 162; 29/35.5, 50, 56.6
See application file for complete search history.

(56) References Cited

U.S. PATENT DOCUMENTS

| 4,520,595 | A | * | 6/1985 | Diener ........................ 451/28 |
| 4,523,360 | A |   | 6/1985 | Giovanola |
| 4,534,686 | A | * | 8/1985 | Nakamura et al. .......... 409/135 |
| 5,452,502 | A |   | 9/1995 | Walter et al. |
| 5,505,653 | A |   | 4/1996 | Nedo et al. |
| 5,815,902 | A | * | 10/1998 | Osterried et al. ........... 29/38 A |
| 5,832,590 | A |   | 11/1998 | Wuerthner |
| 6,609,042 | B1 | * | 8/2003 | Kumeth ....................... 700/116 |
| 6,674,189 | B1 | * | 1/2004 | Watanabe et al. ............. 310/52 |

FOREIGN PATENT DOCUMENTS

| DE | 87 14 508 U | 12/1987 |
| DE | 195 02 341 A1 | 8/1996 |
| DE | 195 04 368 A1 | 8/1996 |

(Continued)

OTHER PUBLICATIONS

Carl Hanser Verlag, Spindeleinheiten Im Werkzeung—maschinenbau, Steuerungen und Antriebe, Feb. 1, 1996, pp. 46-50, vol. 129, No. 1/2, Munich, Germany.

(Continued)

*Primary Examiner*—Willmon Fridie, Jr.
(74) *Attorney, Agent, or Firm*—RatnerPrestia

(57) ABSTRACT

The invention relates to a machining unit in which the pieces are carried by an electric turning spindle radially arranged on a turret with a vertical axis of rotation. On rotation of the turret the pieces are successively introduced into machining stations, arranged peripherally around said turret and comprising tool support means. A large space is thus available around the periphery of the machine for housing the tools. The electric turning spindles are adapted to selectively hold the pieces at any fixed angle, thus permitting not only turning operations but also other machining operations on fixed pieces.

7 Claims, 8 Drawing Sheets

FOREIGN PATENT DOCUMENTS

| | | |
|---|---|---|
| EP | 0 371 936 A2 | 6/1990 |
| EP | 0 785 040 A1 | 7/1997 |
| EP | 0 937 539 A1 | 8/1999 |
| FR | 1 376 657 A | 10/1964 |
| GB | 1 494 173 | 12/1977 |

OTHER PUBLICATIONS

EPO, Patent Abstracts of Japan, vol. 006, No. 201 (M-163), Oct. 13, 1982; JP 57 107759 A, Honda Motor Co. Ltd., Jul. 5, 1982.

* cited by examiner

MULTI-STATION MACHINE WITH ROTATING TRANSFER FOR MACHINING PIECES

This application is a U.S. national phase application of PCT International Application No. PCT/FR02/02037 filed Jun. 14, 2002.

TECHNICAL FIELD OF THE INVENTION

The present invention relates to machine tools for fast machining of long runs of workpieces.

Multispindle lathes are generally used for turning long runs of workpieces. In a multispindle lathe, a plurality of workpieces are held simultaneously, each on one of the spindles of a series of spindles driven by the same motor and disposed parallel to each other, generally in a ring-shaped disposition. The advantage is very fast turning, with good machining accuracy. The disadvantage is that a multispindle lathe performs only turning operations.

Consequently, if a workpiece has to undergo a plurality of successive types of machining, turning can be carried out on a multispindle lathe and the other operations must be carried out as reworking, i.e. after moving the workpiece and fixing it to a support of another machine tool suitable for the other operations. The result of this is complex manipulation and a loss of positional accuracy between the different surfaces produced by the successive machining operations.

Also known in the art are machining centers, in which the workpiece is held in a single machining station and is subjected to the action of a succession of tools. It is then not necessary to demount the workpiece in order to mount it on another support for the successive machining operations, which improves accuracy. The disadvantage is a serious loss of speed, since all the tools work on a single workpiece disposed in a single machining station.

Also known in the art are rotary transfer machines, in which the workpieces are disposed on a rotary turret that feeds them successively to a plurality of machining stations each having its own tools. At present, these rotating transfer machines are used for rework machining after turning by a multispindle lathe.

It might seem tempting to fit other tools to a multispindle lathe to carry out complementary machining operations. However, a multispindle lathe does not lend itself well to the disposition of supplementary tools, in particular because of a lack of space to accommodate the tools; the spindles are namely relatively close together.

The document DE 87 14 508 U discloses a multistation machine comprising:

an indexable rotary turret equipped with a plurality of work-holding devices distributed around the periphery of the turret, a plurality of devices for holding and positioning tools, distributed between a plurality of machining stations around the turret, movable on horizontal lower slides, and adapted to machine the workpieces carried by the work-holding devices, in which machine:

the work-holding devices include turning spindles, in fixed positions on the turret, each with its axis oriented toward the periphery of the turret, and which are driven by a motor offset vertically to drive a workpiece in fast rotation for an operation of turning by turning tools in at least one of the machining stations, the turning spindles are capable of being indexed in all angular positions to allow other machining of the workpiece by suitable other tools in at least one of the machining stations.

The above document does not describe either the benefit of or the means of maximizing the number and the power of the work-holding devices on the turret. Moreover, all the workstations have tool-holders at the front, which impede radial access to the machining region and rule out the loading of bar stock.

STATEMENT OF THE INVENTION

The problem addressed by the present invention is that of designing a new machine tool structure for fast multiple machining, so that all machining operations on a workpiece can be carried out on the same machine and without demounting the workpiece from its support; the structure must be suitable for receiving a sufficient number of tools of sufficient size, without problems in respect of there being space to accommodate them, and ensuring efficient evacuation of machining waste. Also, the structure must be adapted to include a sufficient number of work-holding devices of sufficient power for the machining operations envisaged, whilst minimizing the overall size of the machine tool.

Another problem is to ensure accurate machining of the workpieces, in particular thanks to the accuracy of the work-holding devices.

To achieve the above and other objects, the invention proposes a multi-station rotating transfer machine for machining pieces as claimed in claim 1.

In one advantageous embodiment, at least some of the machining stations have a vertical support wall oriented parallel to the axis of a turning electrospindle and carrying a machining unit carrier plate through the intermediary of an axial slide and a vertical slide constituting a crossed carriage structure.

At least some machining stations preferably include two crossed carriage structures, namely a first structure with a first plate to cover a lower and frontal machining space, and a second structure with a second plate to cover an upper machining space.

One particularly advantageous embodiment of the machine includes lower evacuation passages between the successive vertical support walls. This considerably facilitates the evacuation of machining waste, and is made possible by the fact that the carriages are retained on vertical walls that do not interfere with the evacuation of waste.

The turning electrospindles preferably have a general shape that reduces in size toward the interior of the turret, so that the electrospindles can be accommodated alongside each other in the turret without it being necessary to increase the diameter of the turret.

One problem of a structure of the above kind with spindles carried by a central turret is feeding the turret with electrical, pneumatic, and hydraulic energy. This problem is solved in accordance with the invention by having the turning electrospindles supplied with electrical energy by a bundle of cables and hoses wound around the rotation axis of the turret between a fixed connection region on the frame and a rotary connection region on the turret of the machine. The turret rotation drive means provide alternating rotation of the turret, with a machining sequence with partial rotations in a first direction from an origin position for successively transferring workpieces from station to station between successive machining steps and a fast reverse rotation return sequence to the origin position of the turret. There are advantageously eleven machining sequence partial rotations and a return rotation of 330°.

The fixed connection region is preferably above the turret.

In a first embodiment, the bundle of cables and hoses is wound in a helix around the rotation axis of the turret. In the maximum winding position the helicoidal bundle of cables and hoses can advantageously form a helix with at least four turns of each cable or hose.

In a preferred embodiment, the bundle of cables and hoses is conformed with an S-shape which is folded and unfolded during rotation.

It may be advantageous to drive rotation of the turret with double indexing, that is to say by using a rotation of two steps to turn the turret to move a workpiece from one station to the station after the adjacent station. It is then possible to alternate the types of machining and, for example, to provide six rotary spindle turning operations and six fixed spindle machining operations.

Another problem that the invention proposes to solve is that of machining all the faces of a workpiece. To this end means are provided for machining a first workpiece surface portion in certain stations and then turning the workpiece through 180° to machine its other surface portions. Clearly the means that enable complete machining in two machining sequences and one overturning operation in themselves constitute an independent invention capable of application independently of the presence of the other features described, and in particular independently of the features of claim 1.

BRIEF DESCRIPTION OF THE DRAWINGS

Other objects, features, and advantages of the present invention will emerge from the following description of particular embodiments, which is given with reference to the appended drawings, in which.

DESCRIPTION OF PREFERRED EMBODIMENTS

Figure 1:
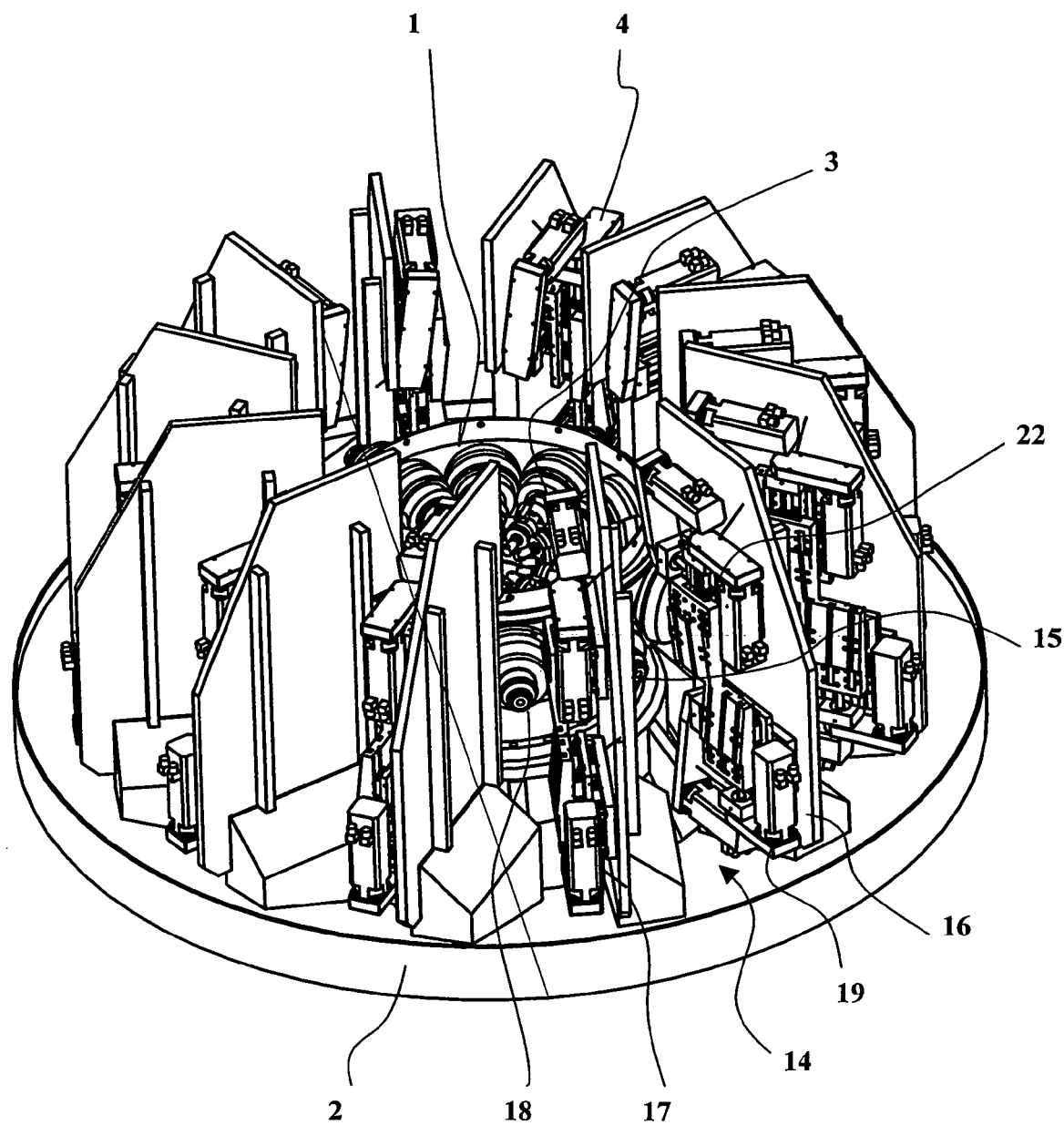
FIG. 1 is a general perspective view of one embodiment of a multi-station machine tool according to the invention.
Figure 2:
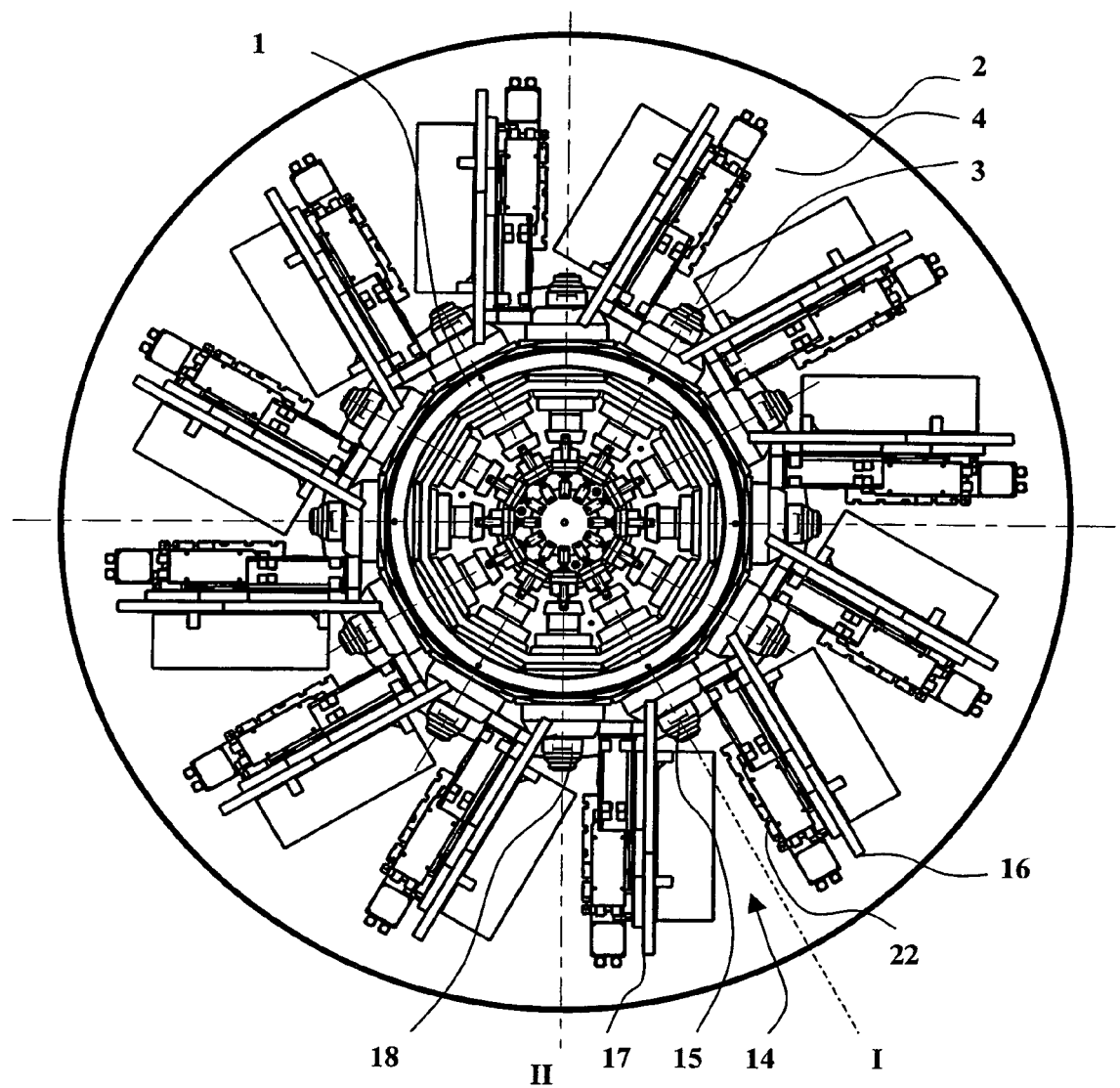
FIG. 2 is a plan view of the FIG. 1 machine.

In the embodiment shown in the figures, as can be seen in FIGS. 1 and 2 in particular, a rotating transfer multi-station machine in accordance with the invention for machining pieces generally includes an indexable rotary turret 1, mounted on a frame 2 to rotate about a vertical axis. The frame 2 includes a plurality of devices for holding and positioning tools, distributed between a plurality of machining stations disposed around the turret 1, and adapted to machine workpieces carried by work-holding devices on the turret 1.

According to the invention, the work-holding devices on the turret 1 are turning electrospindles, for example the electrospindle 3. In the embodiment shown in FIGS. 1 and 2, there are twelve turning electrospindles such as the electrospindle 3, equally distributed around the periphery of the turret 1, and having an axis oriented radially toward the periphery of the turret 1. The turning electrospindles 3 according to the invention are capable of driving in fast rotation a workpiece held on the spindle for a turning operation by turning tools provided at a corresponding machining station.

FIGS. 1 and 2 show twelve machining stations such as the station 4 which, in this position of the turret 1, are in corresponding relationship to the turning electrospindle 3.

The turning electrospindles such as the electrospindle 3 are indexable in all angular positions, thereby retaining a workpiece immobilizing torque that is sufficient to allow machining of the workpiece by suitable tools of the corresponding machining stations such as the machining station 4.

The turning electrospindles are preferably also capable of turning at very low speeds and in perfect synchronism with another movement of the devices for holding and positioning the tools.

As can be seen clearly in FIG. 2, because of the central disposition of the turning electrospindles 3, for reasons of overall size, it is preferable to use turning electrospindles having a general shape that reduces in size in the inward direction, i.e. in the direction toward the central rotation axis of the turret 1. On the other hand, there is a much wider space to contain the tools in the machining station 4 at the periphery of the turning electrospindles 3.

Figure 8:
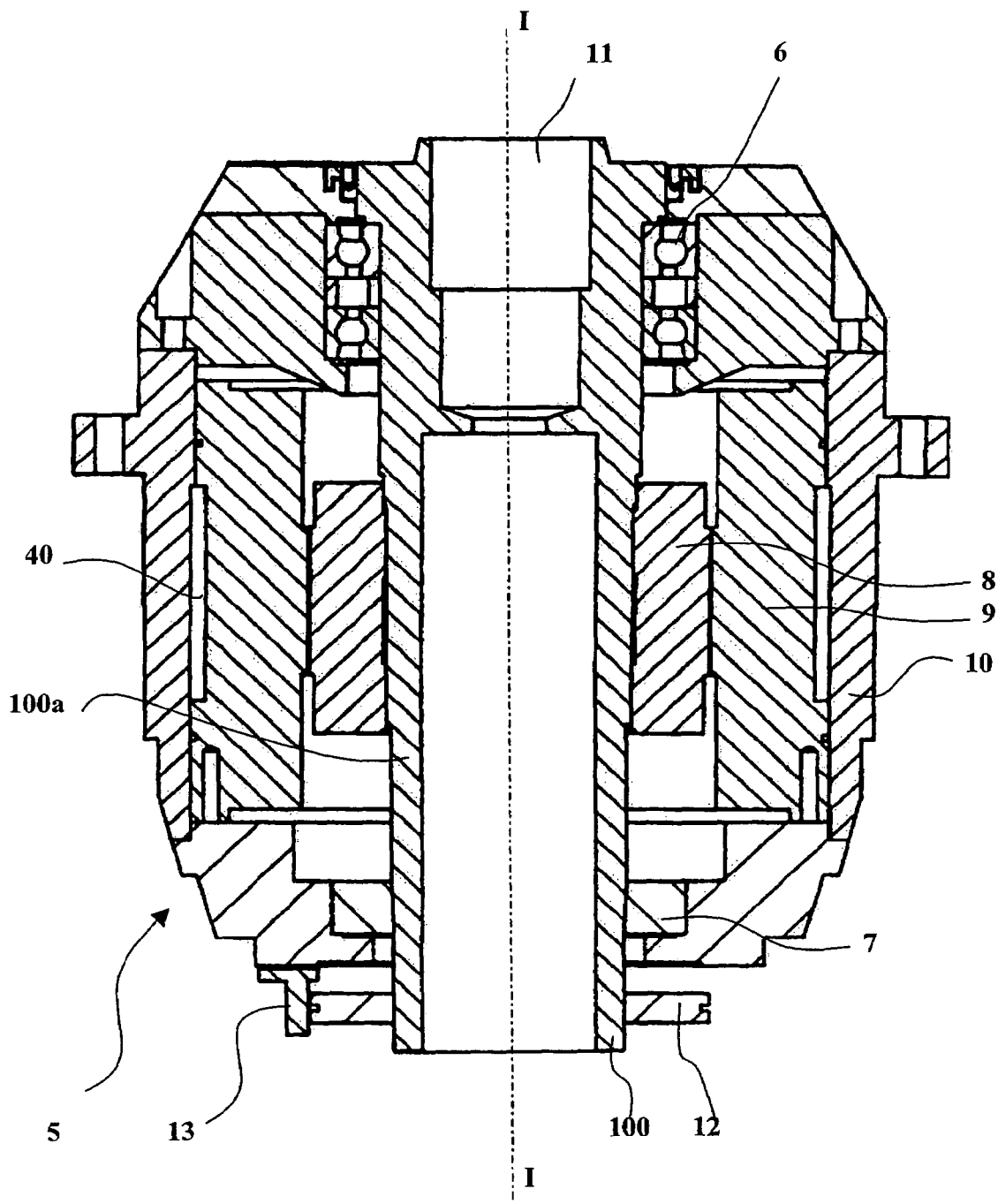
FIG. 8 is a plan view in longitudinal section of one turning spindle structure according to the present invention.

FIG. 8 shows a spindle 100 in the turning electrospindle 5, rotatable about the axis I—I and carried by a first rolling bearing or bearing 6 and a second rolling bearing or bearing 7. The intermediate section 100a of the spindle 100 between the rolling bearings or bearings 6 and 7 is connected to a motor rotor 8 that is driven in rotation inside a motor stator 9. The whole is enclosed in a frame 10. The electrospindle 5 therefore constitutes a compact structure that minimizes the overall size in the axial and radial directions and favors the disposition of a maximum number of electrospindles on the turret, whilst ensuring very accurate holding of the work.

Housings such as the housing 11 are provided in the spindle 100 to contain the workpiece clamping system, which is not shown in the figures.

An encoded wheel 12 is keyed to the spindle 100 and turns in front of an optical sensor 13 supplying spindle angular position signals that are sent to a controller (8, 9) of the motor to command rotation thereof and selectively to command its immobilization against rotation and retention in a particular fixed position appropriate to machining a workpiece held in a fixed position.

To achieve satisfactory machining accuracy, the operating temperature of the electrospindle 5 supporting the workpiece is controlled by cooling it by feeding a cooling liquid into an annular housing 40 at the periphery of the stator 9.

In the embodiment shown in the figures, the machining stations are substantially identical. A machine structure in which the machining stations are different from each other could nevertheless be designed.

Figure 3:
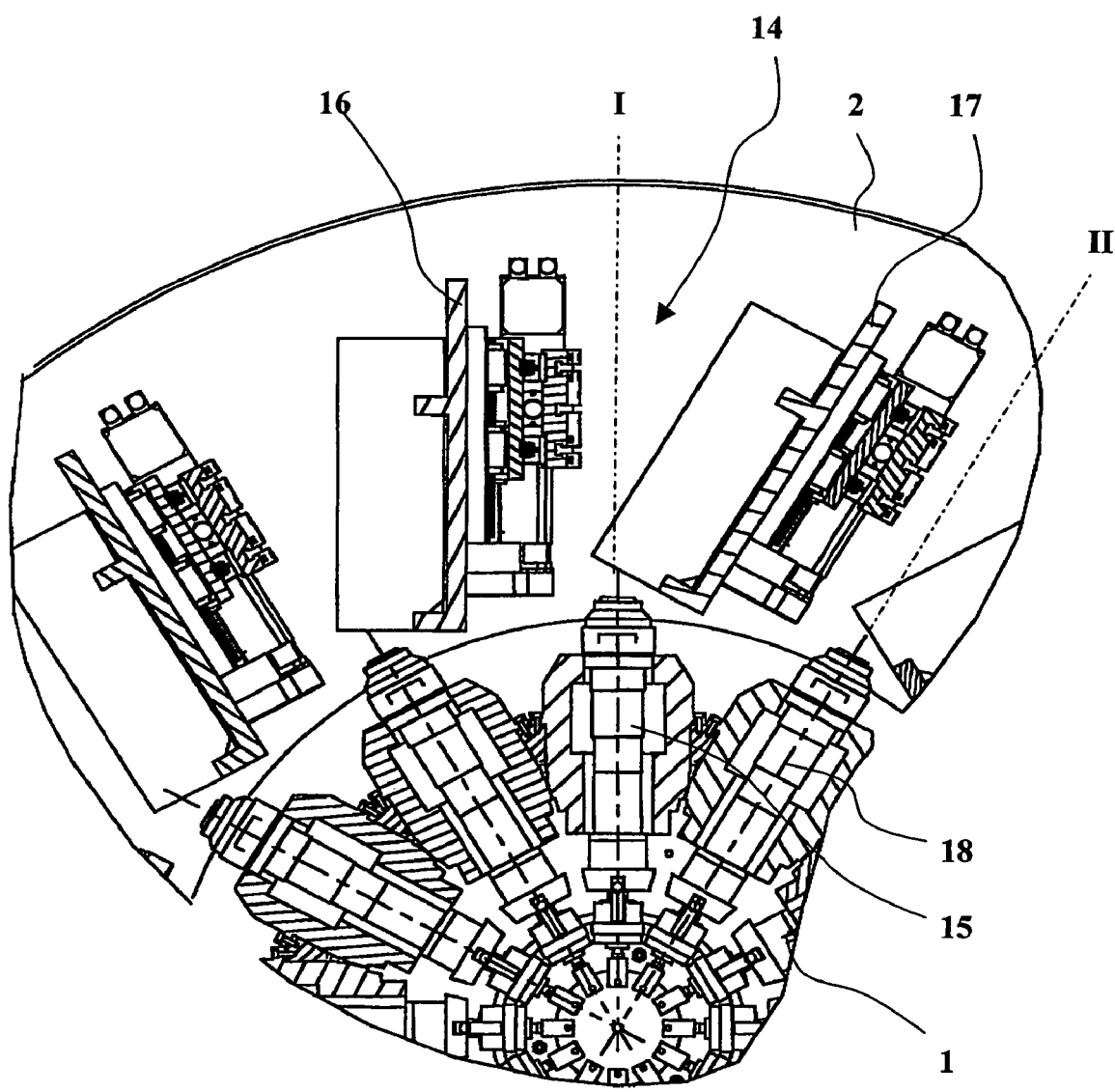
FIG. 3 is a partial plan view in section of the FIG. 1 machine, showing the spindle structures and the work-holding mechanisms.

One machining station, for example the machining station 14 in FIGS. 1 to 3, which is facing a turning spindle 15 in the angular position of the turret 1 shown, is described in more detail next.

The machining station 14 is delimited laterally by two vertical support walls 16 and 17 fixed to the frame 2. The first vertical support wall 16 is oriented parallel to the axis I of the turning spindle 15, and is offset laterally from the axis I to leave room for fixed tools of the machining station 14. The second vertical support wall 17 is parallel to the axis II of the adjacent spindle 18 of the turret 1.

Figure 4:
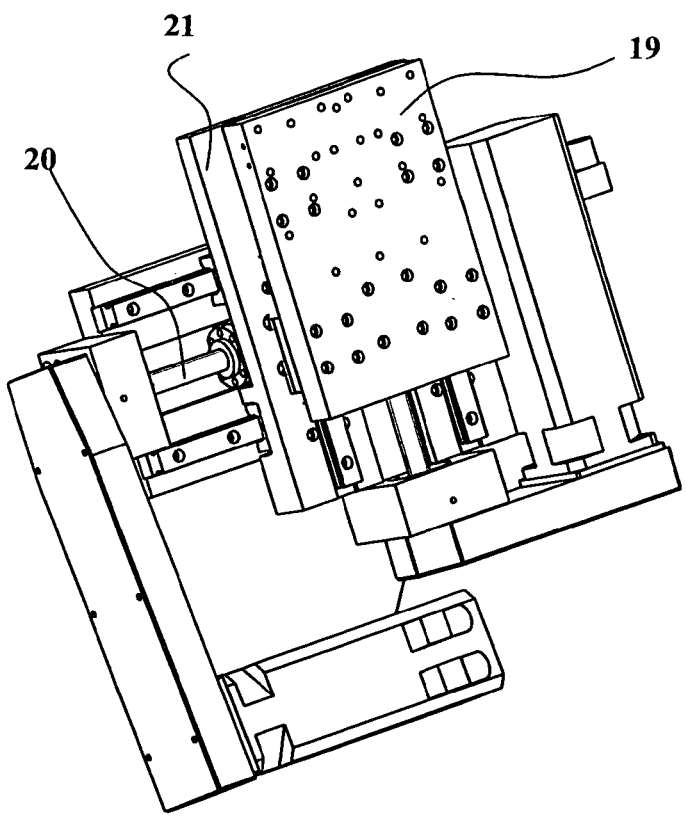
FIG. 4 is a detail perspective view showing the structure of a tool-holder on the FIG. 1 machine.

The first vertical support wall 16 carries a plate 19, seen better in FIG. 4, through the intermediary of an axial slide 20 and a vertical slide 21, constituting a crossed carriage structure. The plate 19 is adapted to carry tools or machining units of the machining station 4. Thus the axial slide 20 moves the tools parallel to the axis of the turning spindle 15 and the vertical slide 21 moves them in the direction perpendicular thereto.

In reality, in the embodiment shown in FIG. 1, the machining station 14 includes a first crossed carriage structure carrying the plate 19 and a second crossed carriage structure carrying a plate 22. The first crossed carriage structure with the plate 19 carries tools in a lower machining space, alongside or below the axis of the turning spindle 15, and the second crossed carriage structure with the plate 22 carries tools in an upper region above or alongside the axis of the turning spindle 15.

The frame 2 is preferably open, including lower evacuation passages in line with each machining station, such as the station 4 or 14, between the vertical support walls, such as the walls 16 and 17. Machining waste can therefore be evacuated downward by gravity without impeding either machining or movement of the turret 1.

Clearly the turning electrospindles such as the electrospindles 3 and 15 of the turret 1 must be supplied with electrical energy for the motor, with hydraulic energy for clamping the workpiece in the spindle, with water for cooling, with oil for lubrication, and possibly with air for certain operations necessitating pneumatic power. According to the invention, all these forms of energy are supplied via a bundle of cables and hoses wound in an appropriate fashion.

Figure 6:
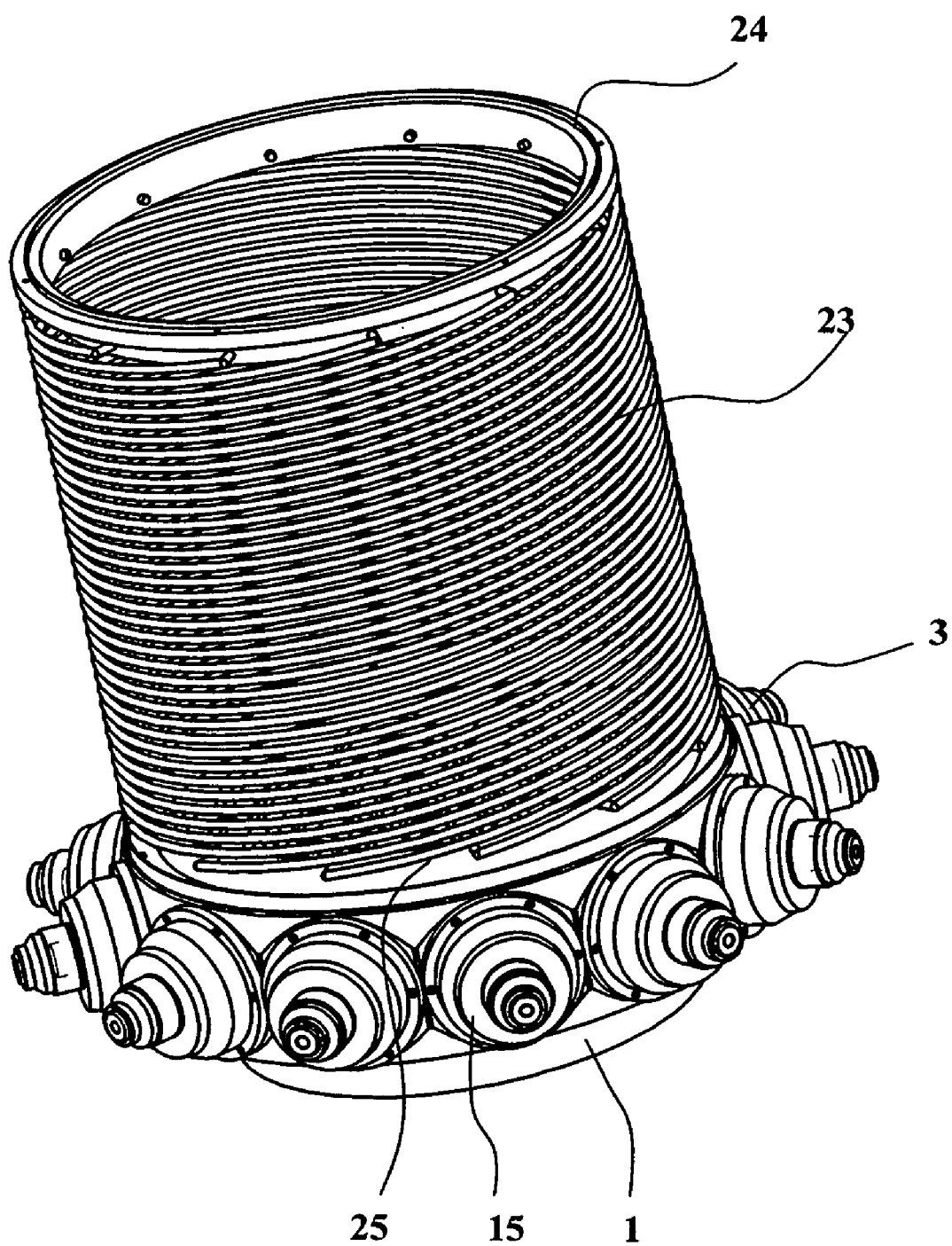
FIG. 6 is a partial perspective view showing a first embodiment of the principle of supplying energy to the turning spindles of the turret.

FIG. 6 shows the turret 1 with turning spindles such as the spindle 15 and the spindle 3. The helicoidal bundle 23 of cables and hoses is wound in a helix between a fixed connection region 24 on the frame 2 and a rotary connection region 25 on the turret 1. The fixed connection region 24 is preferably above the turret 1. Good results are obtained with a helicoidal bundle 23 of cables and hoses comprising at least four turns of each cable or hose when the bundle is in the fully wound state.

Figure 7:
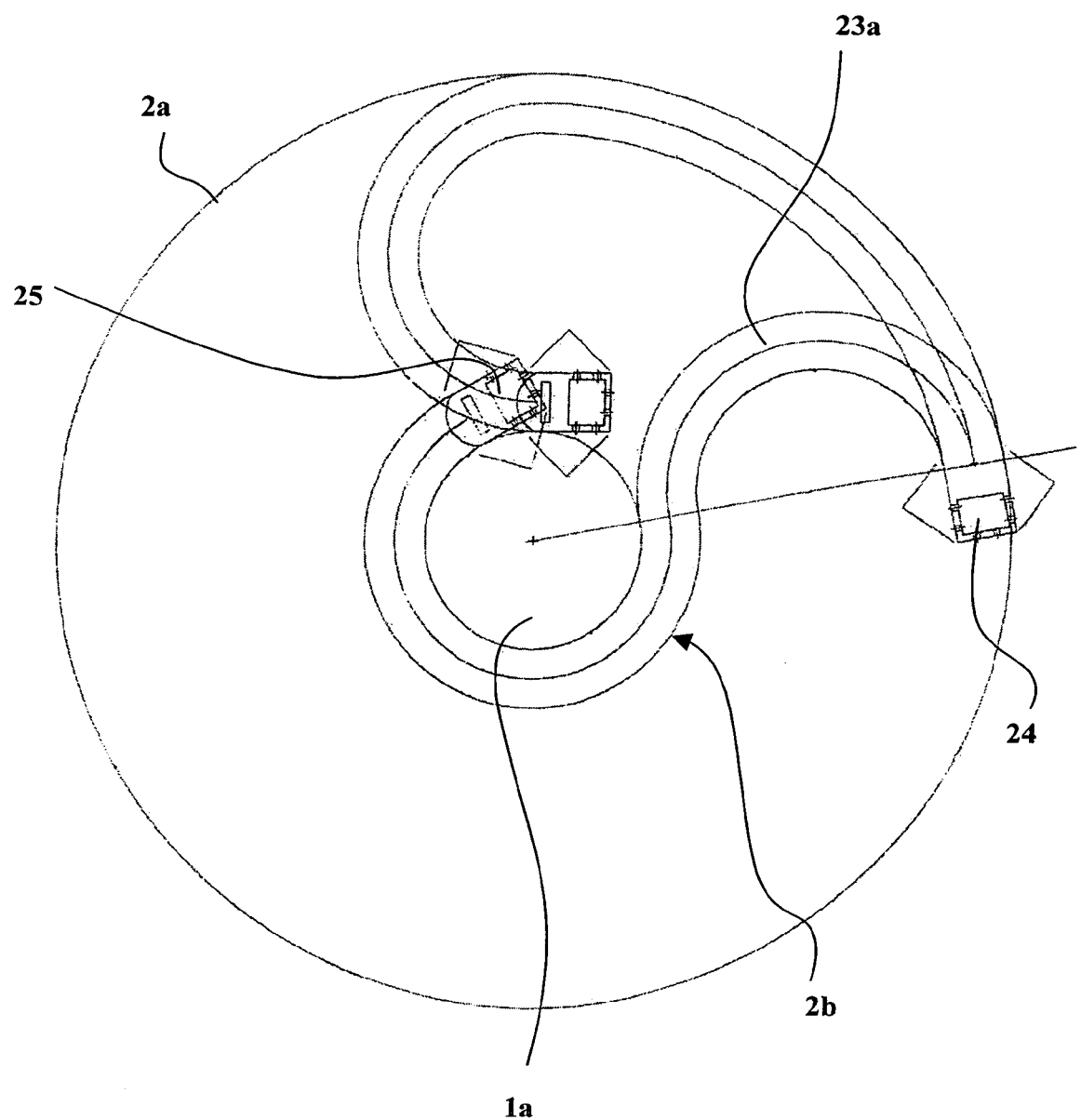
FIG. 7 is a diagrammatic plan view of a preferred embodiment of the means for supplying energy to the turning spindles of the turret.

Alternatively, as shown in FIG. 7, an S-shaped bundle 23a of cables and hoses is wound and unwound between a rotary central hub 1a, a fixed annular peripheral guide 2a, and a fixed annular intermediate guide 2b. The figure shows the two limiting angular positions of the device.

Figure 5:
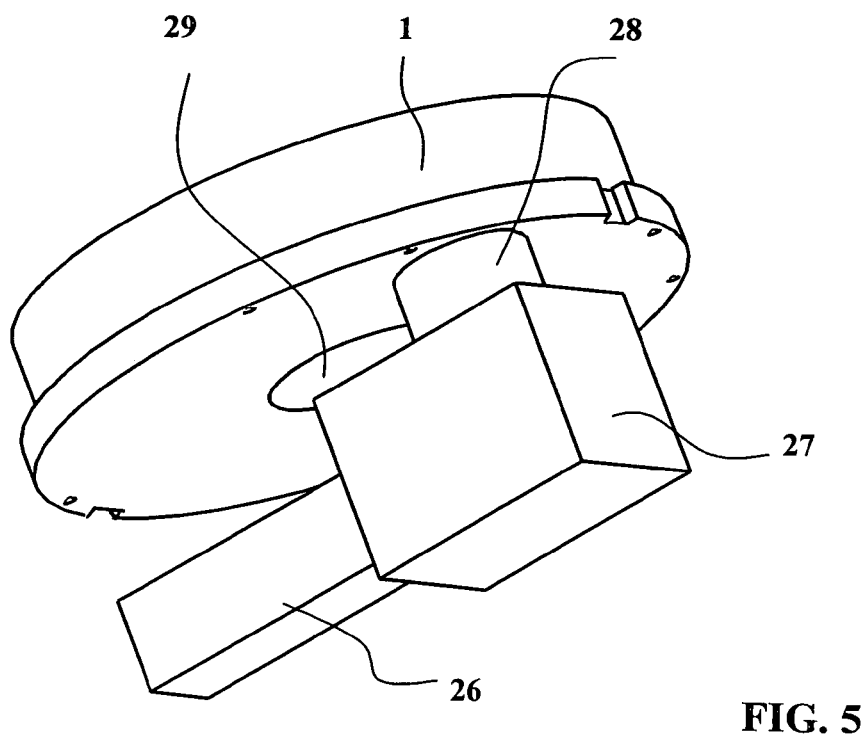
FIG. 5 is a partial perspective view showing the mechanism for driving rotation of the turret.

Clearly the turret 1 must pivot to feed the workpieces from one station to another, and must be indexed in a fixed position when the workpiece is facing the tools of the machining station. The turret 1 can advantageously be held in a fixed position with the aid of HIRTH teeth. FIG. 5 shows diagrammatically the means for driving and indexing the turret 1, namely a motor 26 which drives the turret 1 through a reducer 27, a gear 28, and a wheel 29. Means for marking the angular position of the turret 1 are used to control the motor 26, defining positions in which the turret 1 must be indexed and retained in a fixed position for machining in a machining station. The machining spindles are then facing the machining stations.

The motor 26 is controlled by turret control means for rotating the turret in two rotation directions. In a first direction, the rotation is intermittent, to move the workpieces from station to station. In this first rotation direction, the helicoidal cables and hoses are progressively wound or unwound. A fast reverse rotation through one revolution then unwinds or rewinds the helicoidal bundles of cables and hoses.

The spindle drive means are adapted to drive the spindles selectively at a rotation speed from 0 to approximately 6 000 revolutions/minute, for example, whilst providing a fixed indexing facility and a high immobilization torque to hold the workpieces in a fixed position during certain machining steps. To this end, the spindle motor is advantageously a synchronous motor supplied with power via a numerically controlled power supply unit. The power developed by the spindle motor can advantageously be of the order of 10 kW at a rotation speed of 3 500 revolutions/minute.

The provision of two crossed carriage structures at each workstation enables the workpieces to be machined from above, from the front, and also from below.

The system for holding workpieces on the spindle can be a conventional system such as those that are used at present. Consequently, it is not necessary to describe this system as it will be evident to the person skilled in the art.

The means for driving rotation of the turret 1 can advantageously provide for double indexing, that is to say a single indexing which pivots the turret 1 through a rotation angle corresponding to the angle necessary to feed a workpiece from one workstation to the adjacent workstation, and a double indexing which corresponds to a rotation of the turret to feed a workpiece directly to the machining station after the adjacent station.

The various units of the machine tool according to the invention are advantageously controlled by a centralized controller comprising a stored program control microprocessor with associated memory. The centralized controller receives signals from position sensors such as the optical sensor 13 associated with the encoded wheel 12 and commands the operation of the motors to drive the movements of the workpieces and the tools. Moreover, the centralized controller knows at all times the angular position of the workpiece being machined, even after a turning operation.

Figure 3A:
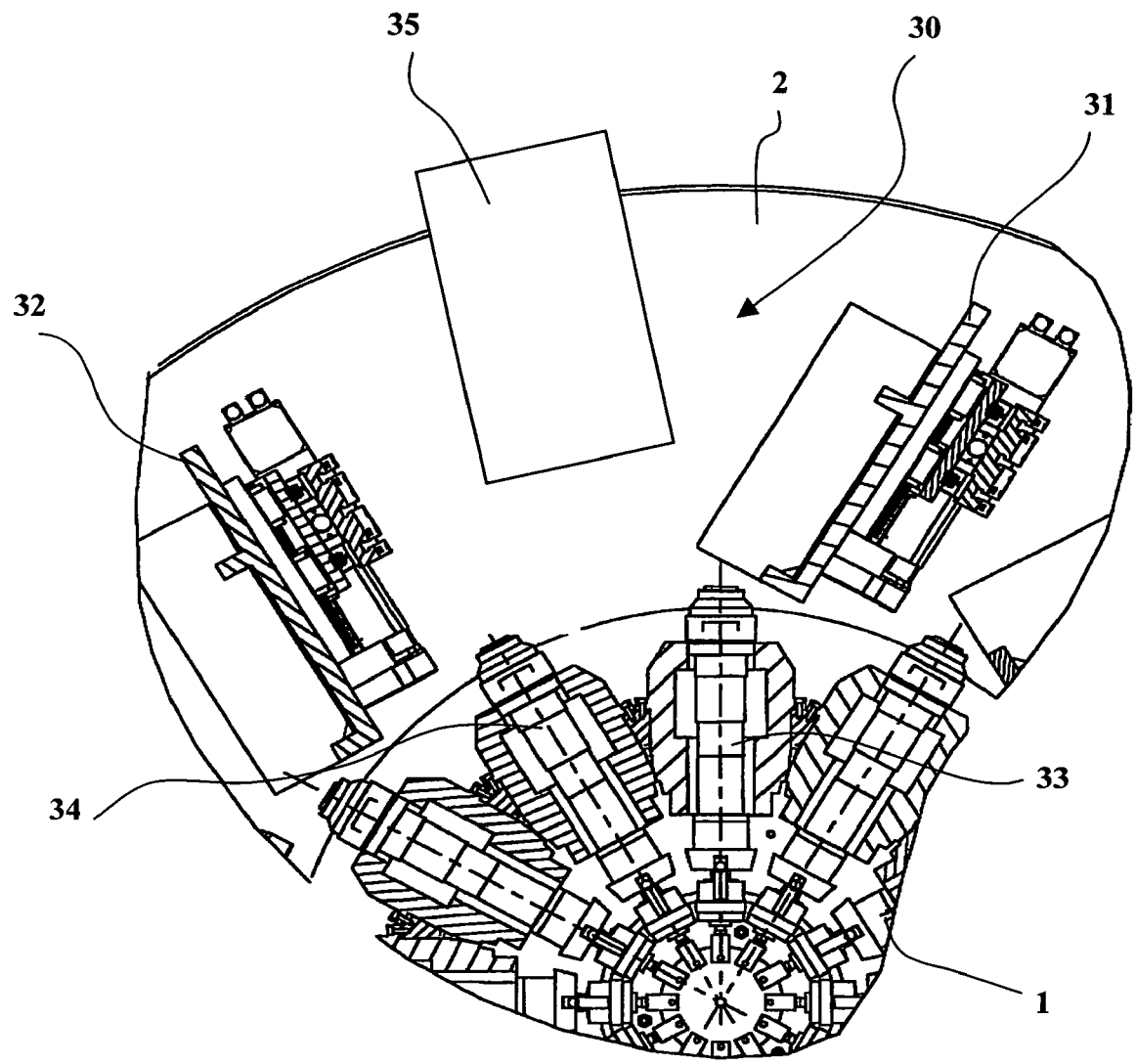
FIG. 3A is a partial plan view in section of a particular embodiment of the machine with a loading and overturning station.

The embodiment shown in FIG. 3A is adapted among other things for automatic loading of the raw material to be machined, regardless of its shape. Thus the embodiment is adapted to the automatic loading of workpieces, billets, or bar stock. To this end, one of the stations around the turret 1, namely the station 30, has no device for holding and positioning tools. A workpiece or billet loading robot, a bar feeder, or any other appropriate device can therefore be fitted at the loading station 30.

In this case, the loading station 30 also forms a radial access space in which an overturning robot 35 can turn workpieces over between two successive machining sequences. Accordingly, the loading station 30 is situated between an adjacent first machining station 31 and an adjacent second machining station 32. At the time concerned, the spindle 33 of the turret 1 is facing the loading station 30 and the spindle 34 is in the adjacent machining station 32. The space in the loading station 30 between the frontal region of the spindle 33 and the frontal region of the spindle 34 is free. As a result of this, in the loading station 30, the overturning robot 35 can remove a workpiece from the turning spindle 33 present at the loading station 30, turn the workpiece through 180°, and engage the workpiece in the turning spindle 34 present in the adjacent station 32.

Instead of or in addition to this, thanks to the disposition of the workstations providing radial access to the machining region, a workpiece overturning robot can be fitted in any machining station to remove a workpiece from the turning spindle that is in the machining station, turn the workpiece over, and engage it again in the same turning spindle, all this after retraction of the tools carried by the tool-holder device of the machining station.

In both cases, the turning spindles must be controlled independently, to clamp and unclamp a workpiece independently of the holding of the workpieces by the other turning spindles of the turret 1, and must preferably provide a workpiece clamping pressure that can be modulated independently of those of the other turning spindles. By the same token, the turning spindles are driven in rotation independently of each other, to adapt flexibly to the various machining operations carried out at the various stations.

As a result, the FIG. 3A embodiment of the device can machine workpieces on all their faces.

The control device of the machine can among other things be programmed to carry out machining in two successive machining sequences with turning over of the workpieces: during a first machining sequence, the blank or the billet engaged on a turning spindle is offered up successively to a plurality of machining stations that machine a first portion of its surface, for example by moving the workpiece to every alternate workstation in succession; the workpiece is then turned over and engaged either on the same turning spindle or on the adjacent spindle; a second machining sequence is executed with the workpiece offered up successively to the same stations, if the workpiece is symmetrical, or to other machining stations if the two sides of the workpiece are different.

The present invention is not limited to the embodiments that have been described explicitly, and includes variants and generalizations thereof within the scope of the following claims.

What is claimed is:

1. A rotating transfer multi-station machine for machining pieces, comprising:
    an indexable rotary turret equipped with a plurality of work-holding devices distributed around the periphery of the turret,
    a plurality of devices for holding and positioning tools, distributed between a plurality of machining stations around the turret and adapted to machine the workpieces carried by the work-holding devices, in which machine:
    the work-holding devices include turning spindles, in fixed positions on the turret, each with its axis oriented toward the periphery of the turret, and which are capable of driving a workpiece in fast rotation for an operation of turning by turning tools in at least one of the machining stations,
    the turning spindles are capable of being indexed in all angular positions to allow other machining of the workpiece by suitable other tools in at least one of the machining stations,
    wherein:
    the work-holding devices are electrospindles, having a compact structure that minimizes their overall size in the axial and radial directions, including a spindle having a section supported by two rolling bearings and carrying directly the rotor of the spindle drive motor,
    the electrospindles are disposed on the turret side by side in contact with or in the immediate vicinity of each other and one after the other, and
    wherein at least some of the machining stations have a support wall oriented substantially parallel to the axis of the turning electrospindle and carrying a carrier plate through the intermediary of an axial slide and a vertical slide constituting a crossed carriage structure.

2. The machine for machining according to claim 1, including in at least certain machining stations, two crossed carriage structures, namely a first structure with a first plate to cover a lower and frontal machining space and a second structure with a second plate to cover an upper machining space.

3. The machine for machining according to claim 1, including lower evacuation passages between the successive vertical support walls.

4. A rotating transfer multi-station machine for machining pieces, comprising:
    an indexable rotary turret equipped with a plurality of work-holding devices distributed around the periphery of the turret,
    a plurality of devices for holding and positioning tools, distributed between a plurality of machining stations around the turret and adapted to machine the workpieces carried by the work-holding devices, in which machine:
    the work-holding devices include turning spindles, in fixed positions on the turret, each with its axis oriented toward the periphery of the turret, and which are capable of driving a workpiece in fast rotation for an operation of turning by turning tools in at least one of the machining stations,
    the turning spindles are capable of being indexed in all angular positions to allow other machining of the workpiece by suitable other tools in at least one of the machining stations,
    wherein:
    the work-holding devices are electrospindles, having a compact structure that minimizes their overall size in the axial and radial directions, including a spindle having a section supported by two rolling bearings and carrying directly the rotor of the spindle drive motor,
    the electrospindles are disposed on the turret side by side in contact with or in the immediate vicinity of each other and one after the other, and wherein
    the machine for machining includes a motor controlled by the turret control means adapted to rotate the turret first with partial rotations in a first direction from an origin position for successively transferring workpieces from station to station between successive machining steps, and then with a fast reverse rotation return sequence for returning to the origin position of the turret.

5. A rotating transfer multi-station machine for machining pieces, comprising:
    an indexable rotary turret equipped with a plurality of work-holding devices distributed around the periphery of the turret,
    a plurality of devices for holding and positioning tools, distributed between a plurality of machining stations around the turret and adapted to machine the workpieces carried by the work-holding devices, in which machine:
    the work-holding devices include turning spindles, in fixed positions on the turret, each with its axis oriented toward the periphery of the turret, and which are capable of driving a workpiece in fast rotation for an operation of turning by turning tools in at least one of the machining stations, the turning spindles are capable of being indexed in all angular positions to allow other machining of the workpiece by suitable other tools in at least one of the machining stations, wherein:

the work-holding devices are electrospindles, having a compact structure that minimizes their overall size in the axial and radial directions, including a spindle having a section supported by two rolling bearings and carrying directly the rotor of the spindle drive motor, the electrospindles are disposed on the turret side by side in contact with or in the immediate vicinity of each other and one after the other, and wherein a loading station around the turret forms a radial access space in which an overturning robot can remove the workpiece from the turning spindle present at the loading station, turn the workpiece through 180°, and engage it in a turning spindle present in the adjacent station, and one of the loading stations around the turret has no work-holding and positioning device and constitutes a loading station for the automatic loading of workpieces, billets, or bar stock.

6. A rotating transfer multi-station machine for machining pieces, comprising:

an indexable rotary turret equipped with a plurality of work-holding devices distributed around the periphery of the turret, a plurality of devices for holding and positioning tools, distributed between a plurality of machining stations around the turret and adapted to machine the workpieces carried by the work-holding devices, in which machine:

the work-holding devices include turning spindles, in fixed positions on the turret, each with its axis oriented toward the periphery of the turret, and which are capable of driving a workpiece in fast rotation for an operation of turning by turning tools in at least one of the machining stations, the turning spindles are capable of being indexed in all angular positions to allow other machining of the workpiece by suitable other tools in at least one of the machining stations, wherein:

the work-holding devices are electrospindles, having a compact structure that minimizes their overall size in the axial and radial directions, including a spindle having a section supported by two rolling bearings and carrying directly the rotor of the spindle drive motor, the electrospindles are disposed on the turret side by side in contact with or in the immediate vicinity of each other and one after the other, and wherein the machine for machining includes at one machining station at least, a workpiece overturning robot that can remove a workpiece from the turning spindle that is present in the station, turn the workpiece over, and engage it in said turning spindle that is present in the station.

7. A rotating transfer multi-station machine for machining pieces, comprising:

an indexable rotary turret equipped with a plurality of work-holding devices distributed around the periphery of the turret, a plurality of devices for holding and positioning tools, distributed between a plurality of machining stations around the turret and adapted to machine the workpieces carried by the work-holding devices, the work-holding devices include turning spindles, in fixed positions on the turret, each with its axis oriented toward the periphery of the turret, and which are capable of driving a workpiece in fast rotation for an operation of turning by turning tools in at least one of the machining stations, and in which the workpiece is also selectively driven slowly or to a fixed position in synchronism with the movement of other suitable tools in at least another machining station, the turning spindles are capable of being indexed in all angular positions to allow other machining of the workpiece by the suitable other tools in at least one of the machining stations, wherein:

the work-holding devices are electrospindles, having a compact structure that minimizes their overall size in the axial and radial directions, the electrospindles being configured to drive the workpiece in a fast rotation, slow rotation, or to a fixed position, the electrospindles are disposed on the turret side by side in contact with or in the immediate vicinity of each other and one after the other, at least some of the machining stations have a support wall oriented substantially parallel to the axis of the turning electrospindle and carrying a machining unit carrier plate having an axial slide and a vertical slide forming a crossed carriage structure.

* * * * *